United States Patent [19]

Takehara et al.

[11] Patent Number: 5,661,573

[45] Date of Patent: Aug. 26, 1997

[54] IMAGE READING APPARATUS HAVING A ROLLER SUPPORTED BY A FLEXIBLE SHAFT

[75] Inventors: Kenichi Takehara, Machida; Yasuo Matsuyama, Isehara, both of Japan

[73] Assignee: Ricoh Company, Ltd., Tokyo, Japan

[21] Appl. No.: 512,785

[22] Filed: Aug. 10, 1995

[30] Foreign Application Priority Data

Aug. 19, 1994 [JP] Japan ................... 6-195072

[51] Int. Cl.$^6$ .................... H04N 1/04; B65H 5/02; B65H 5/04
[52] U.S. Cl. .................... 358/498; 358/496; 271/274
[58] Field of Search .................... 358/400, 496, 358/498; 271/271, 273, 274; 355/50, 233; 399/215; H04N 1/31

[56] References Cited

U.S. PATENT DOCUMENTS

| | | | |
|---|---|---|---|
| 4,974,680 | 12/1990 | Nishida et al. | 271/274 |
| 5,181,715 | 1/1993 | Ohkoda et al. | 271/273 |
| 5,320,341 | 6/1994 | Pease et al. | 271/274 |
| 5,422,732 | 6/1995 | Takayanagi | 358/498 |

FOREIGN PATENT DOCUMENTS 5-63925  3/1993  Japan.

Primary Examiner—Edward L. Coles, Sr.
Assistant Examiner—Kimberly A. Williams
Attorney, Agent, or Firm—Oblon, Spivak, McClelland, Maier & Neustadt, P.C.

[57] ABSTRACT

An image reading apparatus has a read roller having a flexible shaft a deformation of which in a particular direction is prevented so as to prevent a displacement of the read roller. The image reading apparatus reads an image on an original sheet while the original sheet is fed along a reading surface. A roller is pressed against the reading surface so that the original sheet interposed between the roller and the reading surface is fed by a rotation of the roller. A shaft extends from opposite ends of the roller so as to support the roller and transmit a rotational force to the roller. The shaft is rotatably supported, and is capable of being elastically deformed. A deformation of the shaft in a direction perpendicular to a rotational axis of the shaft and parallel to the reading surface is restricted by projecting members contacting the shaft on each side of the roller.

16 Claims, 9 Drawing Sheets

IMAGE READING APPARATUS HAVING A ROLLER SUPPORTED BY A FLEXIBLE SHAFT

BACKGROUND OF THE INVENTION

1) Field of the Invention

The present invention generally relates to image reading apparatuses and, more particularly, to an image reading apparatus reading an image on an original sheet while feeding the original sheet.

2) Description of the Related Art

An image reading apparatus is known in which an original sheet is pressed onto a contact glass or a contact-type image sensor by means of a roller (read roller). For example, Japanese Laid-Open Patent Application No. 5-63925 discloses such an image reading apparatus. In this image reading apparatus, the read roller which presses an original sheet has a width smaller than a width of an original sheet having a minimum size. This is to prevent a projection of opposite ends of the read roller even when a minimum-size original sheet is read.

Since the original sheet is fed only by a rotation of the read roller, an accuracy of a feed speed of the original sheet depends on the read roller. Thus, high accuracy and rigidity are required for the read roller. Accordingly, a shaft of the read roller is made of a metal, and precision machining is required for producing the shaft of the read roller. This causes an increase in a manufacturing cost of the read roller.

Recently, a roller having a shaft formed by plastic molding has been used to reduce the manufacturing cost of the roller. However, it is difficult to achieve high accuracy and rigidity for such a mold-formed shaft, and thus the mold-formed shaft is used only for a roller, such as an eject roller, which does not require high accuracy and rigidity. Additionally, a fiber-reinforced plastic molded shaft may be used for forming the shaft of the read roller instead of the metal shaft.

On the other hand, a plastic molded shaft, which is long and has an appropriate flexibility, has become practically used for the read roller which has a narrow width so that the read roller contacts only a middle portion of the original sheet. This read roller is pressed onto a contact glass or a contact-type image sensor by an elastic force of the plastic molded shaft. This read roller reduces a manufacturing cost since the shaft can be formed by low-cost plastic molding. However, since the shaft of the read roller is flexible, the roller may be displaced in an undesired direction other than the direction toward the contact glass or the contact-type image sensor. Accordingly, there is a problem in that a stable feed of the original sheet cannot be achieved due to an undesired displacement of the roller.

Additionally, when an original sheet is caught between the read roller and the contact glass due to a reason such as paper jamming, the jammed original sheet may be pulled by force. At this time, an excessive force may be applied to the shaft, and thus there is a problem in that a permanent deformation or damage occurs in the shaft.

SUMMARY OF THE INVENTION

It is a general object of the present invention to provide an improved and useful image reading apparatus in which the above-mentioned problems are eliminated.

A more specific object of the present invention is to provide an image reading apparatus having a read roller having a flexible shaft a deformation of which in a particular direction is prevented so as to prevent a displacement of the read roller.

In order to achieve the above-mentioned objects, there is provided according to the present invention an image reading apparatus for reading an image on an original sheet while the original sheet is fed along a reading surface, the image reading apparatus comprising:

a roller which is pressed against the reading surface so that the original sheet interposed between the roller and the reading surface is fed by a rotation of the roller;

a shaft extending from opposite ends of the roller so as to support the roller and transmit a rotational force to the roller, the shaft capable of being elastically deformed;

supporting means for rotatably supporting the shaft; and restricting means for restricting a deformation of the shaft in a direction perpendicular to a rotational axis of the shaft and parallel to the reading surface.

According to the present invention, the shaft made of an elastic material such as a plastic can be used without deformation in the direction perpendicular to the rotational axis of the shaft because the deformation is prevented by the restricting means. Accordingly, a manufacturing cost of an assembly of the roller and the shaft can be reduced while a stable feed operation of the original sheet is achieved. Additionally, a permanent deformation of or damage to the shaft is prevented when an undesired force is applied to the roller in the direction perpendicular to the rotational axis of the shaft.

In one embodiment, the restricting means comprises a pair of protruding members contacting the shaft. The protruding members may be a predetermined distance apart from the shaft so that the roller is displaced in a desired position or inclined in a desired direction when the original sheet is fed.

Other objects, features and advantages of the present invention will become more apparent from the following detailed description when read in conjunction with the accompanying drawings.

DETAILED DESCRIPTION OF THE PREFERRED EMBODIMENTS

Figure 1A:
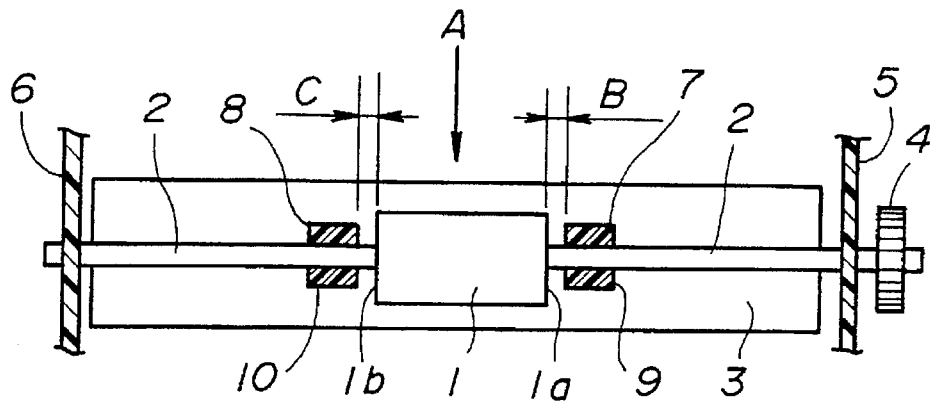
FIG. 1A is a plan view of a part of an image reading apparatus according to a first embodiment of the present invention.
Figure 1B:
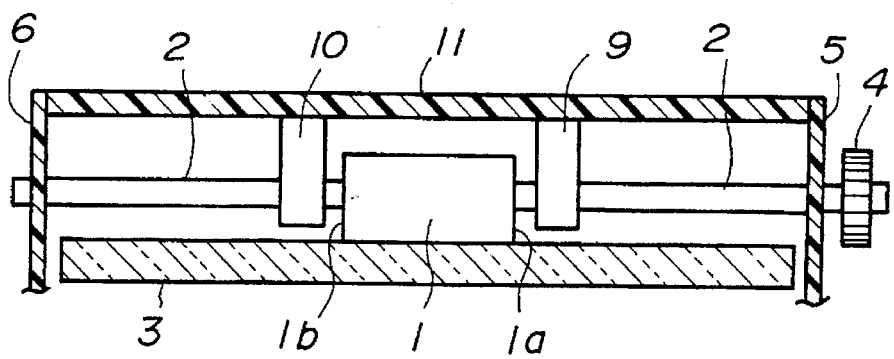
FIG. 1B is a front view of the part of the image reading apparatus shown in FIG. 1A.
Figure 1C:
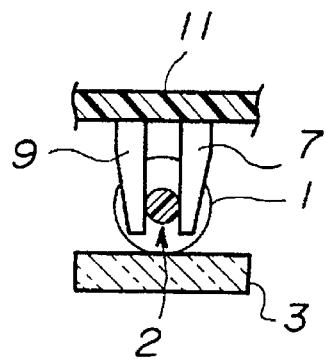
FIG. 1C is a side view of the part of the image reading apparatus shown in FIG. 1A.

A description will now be given of a first embodiment according to the present invention. FIGS. 1A, 1B and 1C show a part of an image reading apparatus according to the present invention in which part a read roller is provided.

A roller 1 is positioned in the middle of a width of an original sheet feeding area. The roller 1 is made of an elastic material such as rubber, and has a generally cylindrical shape. An outer circumferential surface of the roller 1 is pressed against a contact glass 3 so that an original sheet is feed by a rotation of the roller 1 when the original sheet is interposed between the roller 1 and the contact glass 3. An image on the original sheet is read by an image sensor (not shown in the figures) through the contact glass 3. The original sheet is fed in a direction indicated by an arrow A in FIG. 1A.

A shaft 2 is extended from opposite ends of the roller 1. The shaft 2 is made of an elastic material such as a molded plastic. The shaft 2 is integrally formed with the roller 1 so that the roller 1 and the shaft 2 rotate together. A gear 4 is attached on an end of the shaft 2. Hereinafter, an assembly of the roller 1 and the shaft 2 may be referred to as a read roller.

The shaft 2 is preferably formed of an elastic material so as to reduce transmission of vibration and sound. Synthetic resin is particularly suitable for the material of the shaft 2 because of its low coefficient of friction and self lubrication. Additionally, the synthetic resin is flexible and has a large specific strength, a low heat conductivity and a high electrical insulation effect. Furthermore, the synthetic resin is easily molded which makes it suitable for mass production.

The contact glass 3 is made of a glass material having a good transparency. A light is projected from a light source (not shown in the figures) to a surface of the original sheet through the contact glass 3, and the reflected light is directed to a scanner (not shown in the figures) by passing through the contact glass 3.

The gear 4 is fixed on an end of the shaft 2 so as to rotate together with the shaft 2. The gear 4 engages with a drive gear of a motor (both not shown in the figures) so as to transmit a rotational force of the motor to the shaft 2. Opposite ends of the shaft 2 are rotatably supported by side plates 5 and 6, respectively. The side plates 5 and 6 constitute supporting means.

A top plate 11 bridges above the read roller and between the side plates 5 and 6. A pair of first protruding members 7 and 8 are extended from the top plate 11. The first protruding member 7 is positioned near an end 1a of the roller 1, and the first protruding member 8 is positioned near the other end 1b of the roller 1. A distance B between the protruding member 7 and the end 1a of the roller 1 is equal to a distance C between the protruding member 8 and the end 1b of the roller 1. Each of the first protruding members 7 and 8 just contacts the shaft 2 or a very small gap is formed therebetween so that no pressing force is applied to the shaft 2.

A pair of second protruding members 9 and 10 are extended from the top plate 11. The second protruding members 9 and 10 are positioned on the opposite side of the first protruding members 7 and 8 with respect to the shaft 2. The positional relationship between the roller 1 and each of the second protruding members 9 and 10 is the same as that of the first protruding members 7 and 8. Each of the second protruding members 9 and 10 just contacts the shaft 2 or a very small gap is formed therebetween so that no pressing force is applied to the shaft 2. The first and second protruding members 7, 8, 9 and 10 constitute restricting means.

As shown in FIG. 1C, a portion of the shaft 2 which is near the end 1a of the roller 1 is interposed between the first protruding member 7 and the second protruding member 9. Similarly, a portion of the shaft 2 which is near the end 1b of the roller 1 is interposed between the first protruding member 8 and the second protruding member 10. Each of the first and second protruding members 7, 8, 9, 10 has a rigidity sufficient to stop a movement of the roller 1 in directions perpendicular to the rotational axis of the read roller and parallel to the plane of the contact glass 3.

Figure 2:
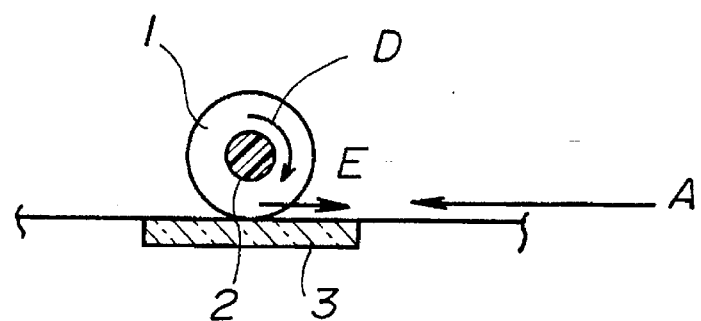
FIG. 2 is a side view of a read roller and a contact glass shown in FIG. 1A.

A description will now be given, with reference to FIG. 2, of the effects of the first and second protruding members 7, 8, 9 and 10. FIG. 2 is a side view of the read roller and the contact glass 3.

In FIG. 2, an arrow A corresponds to the arrow A of FIG. 1A. An arrow D indicates a rotating direction of the roller 1, and an arrow E indicates a moving direction of the roller 1. That is, in FIG. 2, when the roller 1 rotates in the direction E so as to feed the original sheet in the direction A, the roller 1 tends to move in the direction E which is the opposite direction to the original sheet feeding direction A. This is due to a friction force between the roller 1 and the contact glass 3 or the original sheet. At this time, since the shaft 2 is flexible, the shaft 2 is bent due to a force applied to the roller 1 in the direction E. Accordingly, the roller 1 is not maintained at a correct position, and an undesired vibration of the shaft 2 and the roller 1 is generated. This causes an unstable feed of the original sheet, resulting in a deterioration in image quality.

However, in the present embodiment, since the first protruding members 7 and 8 restrict a deformation of the shaft 2 in the direction E, the shaft 2 is maintained to be straight and thus the roller 1 is maintained in a correct position. Thus, a stable feed of the original sheet can be achieved, and deterioration in image quality is eliminated.

When a force is applied to the roller 1 in a direction opposite to the direction E when a user pulls an original sheet jammed between the roller 1 and the contact glass 3, the shaft tends to bend in the direction opposite to the direction E. This may cause a permanent deformation of or damage to the shaft 2. However, in the present embodiment, since the second protruding members 9 and 10 restrict a deformation of the shaft 2 in the direction opposite to the direction E, a deformation of or damage to the shaft 2 is prevented and the shaft 2 is maintained to be straight even when an excessive force is applied to the shaft 2 in the direction opposite to the direction E.

Since the first and second protruding members 7, 8, 9 and 10 are positioned near the ends of the roller 1, a displacement of the roller 1 is a minimum even if portions between the ends of the roller 1 and each of the first and second protruding members 7, 8, 9 and 10 are bent. Additionally, since the first protruding members 7 and 8 are positioned at an equal distance from the respective ends of the roller 1, the roller 1 does not incline with respect to the rotational axis of the roller 1. Thus, the original sheet can be fed along a straight line.

Figure 3:
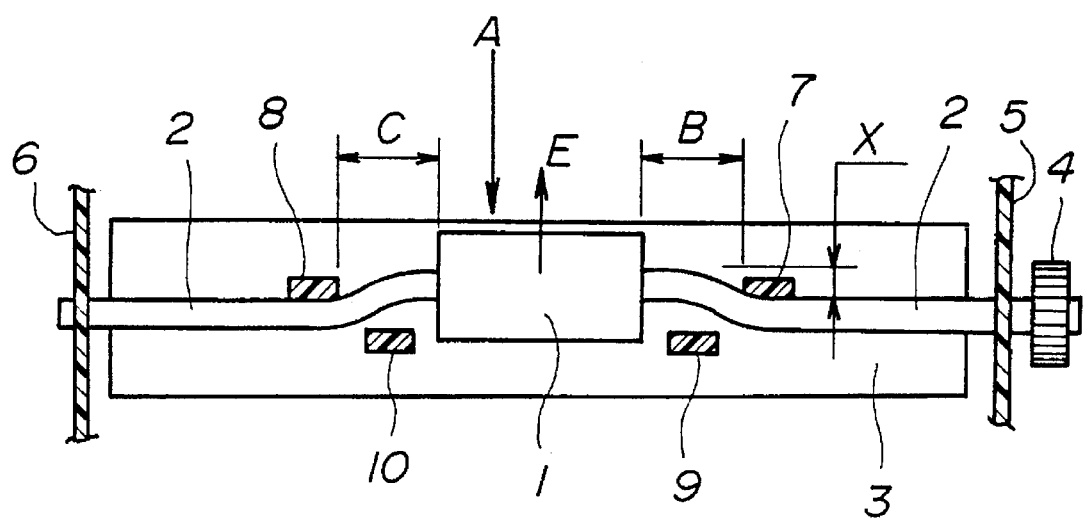
FIG. 3 is a front view of a part of an image reading apparatus according to a second embodiment of the present invention.

A description will now be given of a second embodiment according to the present invention. FIG. 3 is a front view of a part of an image reading apparatus according to the second embodiment of the present invention. In FIG. 3, parts that are the same as the parts shown in FIG. 1A are given the same reference numerals, and descriptions thereof will be omitted.

In this embodiment, the first protruding members 7 and 8 are positioned apart from the respective ends of the roller 1. That is, the distances B and C are greater than the distances B and C of the first embodiment. In this embodiment, similarly to the first embodiment, the distance B is equal to the distance C. Since the first protruding member 7 and 8 are apart from the respective ends of the roller 1, portions of the shaft 2 between the first protruding members 7 and 8 are bent when a force is applied in the direction E due to the rotation of the roller 1. Accordingly, the roller 1 is displaced by a distance X in the direction E.

Figure 4A:
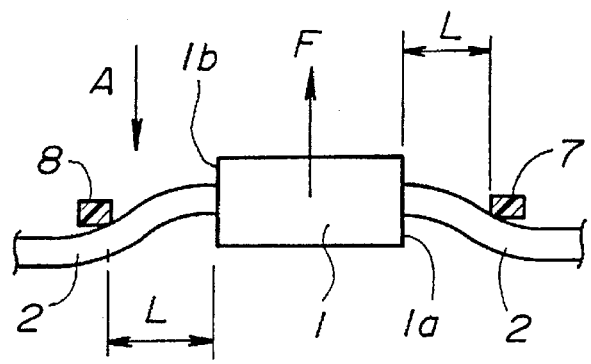
FIGS. 4A, 4B and 4C are illustrations for explaining a deformation of a shaft and a displacement of a roller shown in FIG. 3.
Figure 4B:
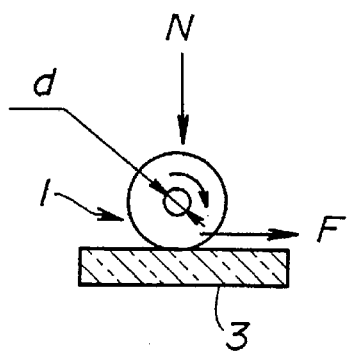
Figure 4C:
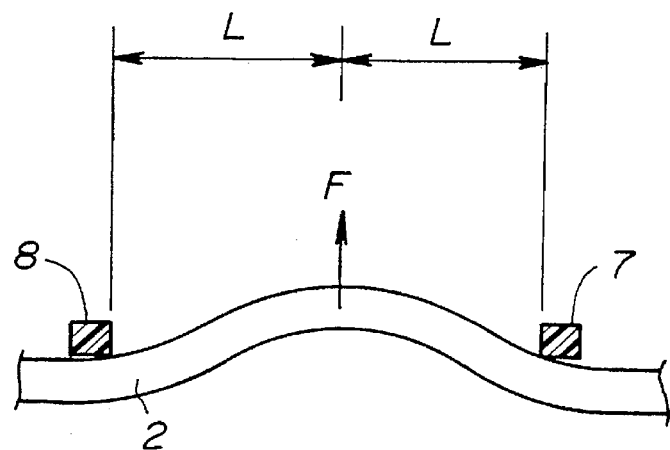

FIGS. 4A, 4B and 4C are illustrations for explaining a deformation of the shaft 2 and a displacement of the roller 1. A distance L between each of the first protruding members 7 and 8 and the respective ends 1a and 1b producing a given displacement distance X can be calculated by the following relationships, where N is a pressing force of the roller 1 against the contact glass 3; d is a diameter of the shaft 2; μ is a coefficient of friction between the roller 1 and the contact glass 3; F is a force applied to the roller 1; E is Young's modulus; I is a geometrical moment of inertia.

$$F = \mu N \tag{1}$$

On the assumption that a portion of the shaft 2 surrounded by the roller 1 does not deform, the illustration of FIG. 4A can be simply represented by the illustration of FIG. 4C. Accordingly, the displacement X of the roller 1 is calculated by the following relationship.

$$X = \frac{F \cdot L \cdot L}{6 \cdot 2L \cdot E \cdot I} \{-L^2 + L(L + 2L)\} \tag{2}$$

$$= \frac{FL^3}{6EI}$$

The relationship (2) is represented by the following relationship (4) by substituting the relationships (1) and (3).

$$I = \frac{\pi}{64} d^4 \tag{3}$$

$$X = \frac{MN \cdot L^3}{6E \cdot \frac{\pi}{64} d^4} \tag{4}$$

$$= \frac{32\mu N L^3}{3E\pi d^4}$$

The distance L between each of the first protruding members 7 and 8 and the respective ends of the roller 1 producing the given displacement distance is obtained by solving the relationship (4) for L.

$$L = \sqrt[3]{\frac{3XE\pi d^4}{32\mu N}} \tag{5}$$

As mentioned above, the roller 1 can be displaced, when the roller 1 is rotated, by a predetermined distance in the direction opposite to the feeding direction of the original sheet. Thus, even when a leading edge of the original sheet is not properly aligned due to an insufficient insertion of the original sheet, the original sheet can be caught between the roller 1 and the contact glass 3 because the roller 1 moves toward the original sheet by the distance X. Accordingly, a reliable initial feed of the original sheet can be achieved.

Figure 5:
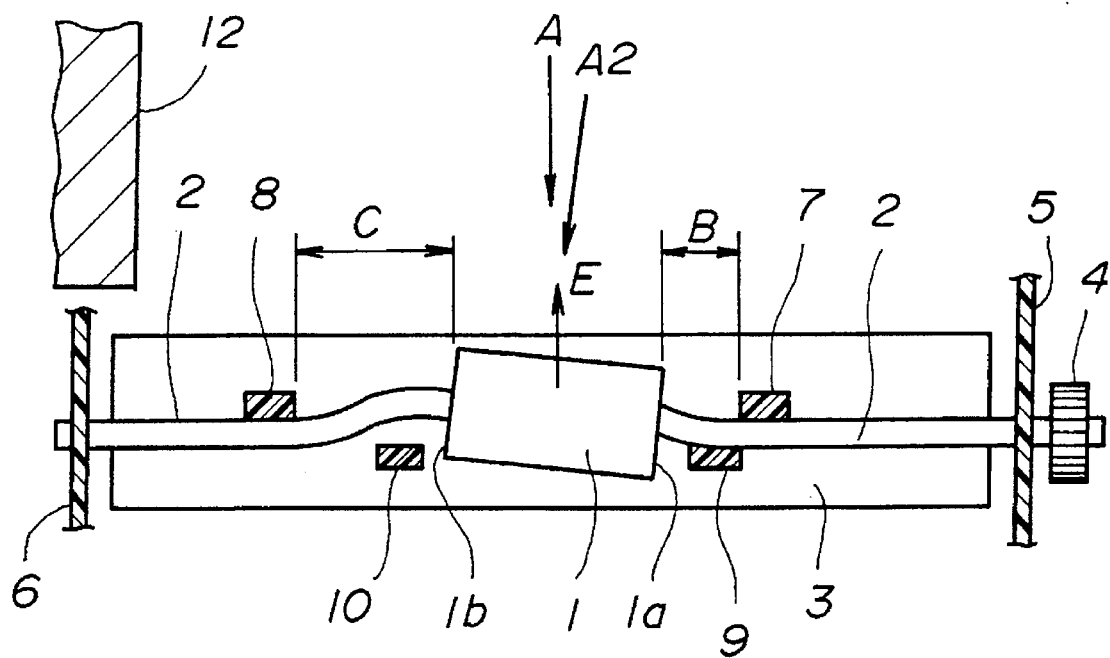
FIG. 5 is a plane view of a part of an image reading apparatus according to a third embodiment of the present invention.

A description will now be given of a third embodiment according to the present invention. FIG. 5 is a bottom view of a part of an image reading apparatus according to the third embodiment of the present invention. In FIG. 5, parts that are the same as the parts shown in FIG. 1A are given the same reference numerals, and descriptions thereof will be omitted.

In this embodiment, as shown in FIG. 5, a fixed guide (guiding member) 12 is provided which guides the original sheet when the original sheet is fed by the roller 1. Additionally, the distance C between the first protruding member 8 and the end 1b of the roller 1 is greater than the distance B between the first protruding member 7 and the end 1a of the roller 1. The first protruding member 8 is provided on the side of the fixed guide 12 with respect to the roller 1. If a force is applied to the roller 1 in the direction E due to the rotation of the roller 1, the roller 1 inclines toward the first protruding member 7. This is because the distance C is greater than the distance B, and thus a deformation of a portion of the shaft corresponding to the distance C is greater than a deformation of the shaft 2 corresponding to the distance B. Accordingly, the original sheet tends to move substantially toward the fixed guide 12 as indicated by an arrow A2 in FIG. 5. Thereby, a side of the original sheet is always pressed against the fixed guide 12, and thus the original sheet never moves in a direction away from the fixed guide 12. That is, the movement of the original sheet parallel to the feeding direction is ensured by the slight inclination of the roller 1 and the fixed guide 12.

It should be noted that the fixed guide 12 may be formed as a wall of a body of the image reading apparatus, and additional parts are not needed to provide the fixed guide 12. Additionally, since the fixed guide 12 is needed on one side of the feeding area, the construction of an original sheet guide of the present embodiment is simple as compared to the conventional guide in which a guiding member is needed on both sides. Thus a manufacturing cost of the image reading apparatus is reduced.

Figure 6A:
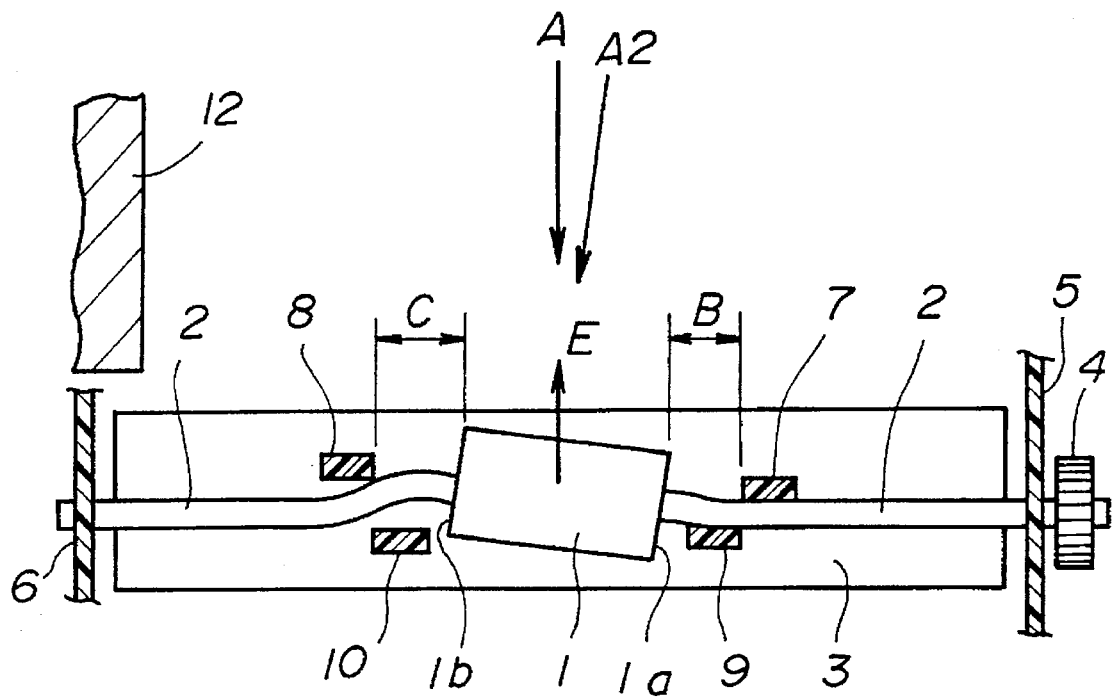
FIG. 6A is a plan view of a part of an image reading apparatus according to a fourth embodiment of the present invention.

A description will now be given of a fourth embodiment according to the present invention. FIG. 6A is a bottom view of a part of an image reading apparatus according to the fourth embodiment of the present invention. In FIG. 6, parts that are the same as the parts shown in FIG. 5 are given the same reference numerals, and descriptions thereof will be omitted.

Figure 6B:
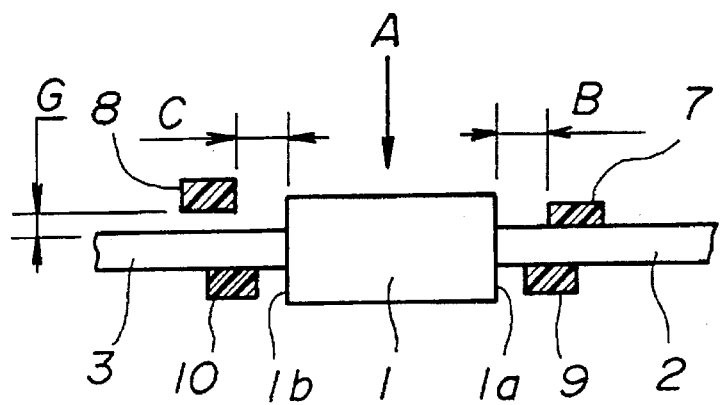
FIG. 6B is an illustration for explaining positions of first protruding members shown in FIG. 6A.

In this embodiment, the distance C between the first protruding member 8 and the end 1b of the roller 1 is equal to the distance B between the first protruding member 7 and the end 1a of the roller 1, but the first protruding member 8 is positioned a predetermined distance G apart from the shaft 2 as shown in FIG. 6B. In this embodiment, similarly to the third embodiment, a portion of the shaft 2 on the side of the fixed guide 12 with respect to the roller 1 is bent greater than a portion of the shaft 2 on the opposite side. Accordingly, the fourth embodiment has the same advantages as that of the third embodiment.

Figure 7A:
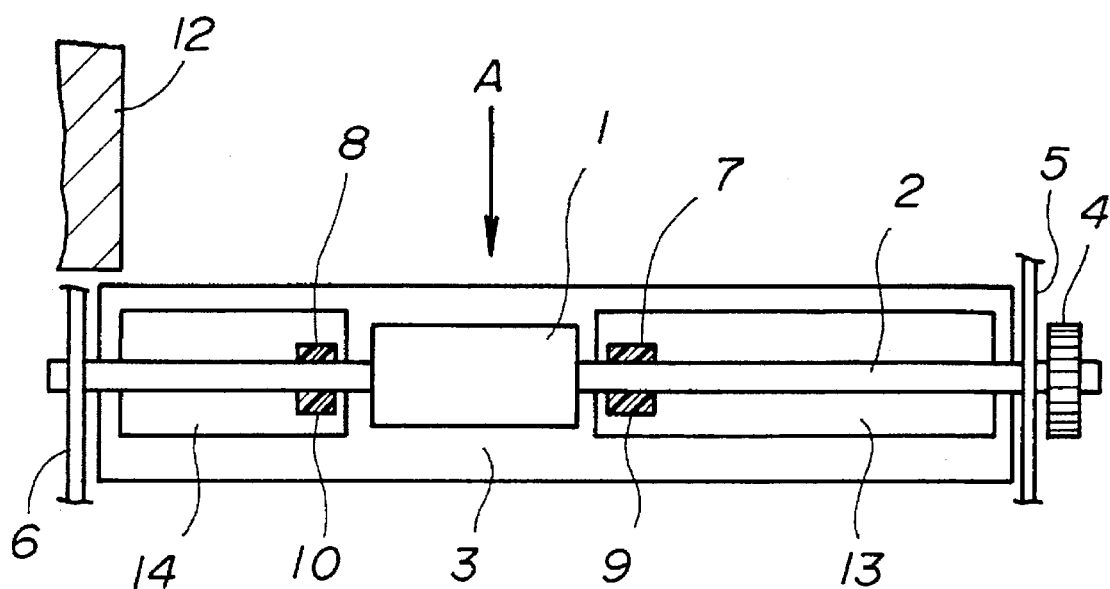
FIG. 7A is a plan view of a part of an image reading apparatus according to a fifth embodiment of the present invention.

A description will now be given of a fifth embodiment according to the present invention. FIG. 7A is a bottom view of an image reading apparatus according to the fifth embodiment of the present invention. In FIG. 7A, parts that are the same as the parts shown in FIGS. 1A and 5 are given the same reference numerals, and descriptions thereof will be omitted.

Figure 7B:
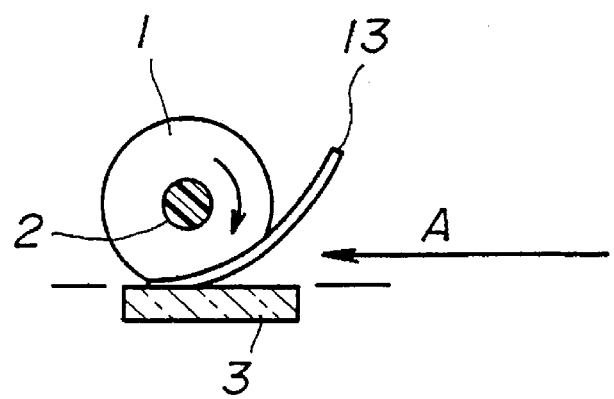
FIG. 7B is a side view of an elastic sheet member and a roller shown FIG. 7A.

As shown in FIG. 7A, this embodiment has the same construction as that of the first embodiment shown in FIG. 1A except for the fixed guide 12 and elastic sheet members 13 and 14 being added. An end of each of the elastic sheet members 13 and 14 is fixed to the top plate 11 (refer to FIG. 1B). Each of the elastic sheet members 13 and 14 is extended from the top plate 11 to the contact glass 3 so that the other end of each of the elastic sheet members 13 and 14 is pressed against the contact glass 3 as shown in FIG. 7B. The elastic sheet member 14 is provided on the fixed guide 12 side with respect to the roller 11. The elastic member 13 is provided on the opposite side of the fixed guide 12. Each of the elastic sheet members 13 and 14 is made of a polyester sheet colored in white. Each of the elastic sheet members 13 and 14 presses the original sheet against the contact glass 3 when the original sheet is fed by the roller 1. Thus, an entire original sheet is pressed against the contact glass 3. This prevents a lift of the original sheet from the contact glass 3 in areas other than the area pressed by the roller 1, and thus ensures a good contact of the original sheet to the contact glass 3.

In this embodiment, the roller 1 is positioned off from the center of the shaft 2, and is positioned on the fixed guide 12 side. Accordingly, the length of the elastic sheet member 14 is shorter than the length of the elastic sheet member 13. In this construction, when the original sheet is fed by the roller 1 while the original sheet contacts the elastic members 13 and 14, the side contacting the elastic member 13 receives a greater friction force than the side contacting the elastic sheet member 14. Accordingly, a side force in a direction substantially toward the fixed guide 12 is exerted on the original sheet which causes the original sheet to move toward the fixed guide 12. Thus, the original sheet always contacts the fixed guide 12, and is fed while guided by the fixed guide 12.

As mentioned above, in the present embodiment, an entire original sheet is pressed against the contact glass 3, and the original sheet is guided by the single fixed guide 12 by a simple construction. Thus, a manufacturing cost of the image reading apparatus can be reduced.

Figure 8A:
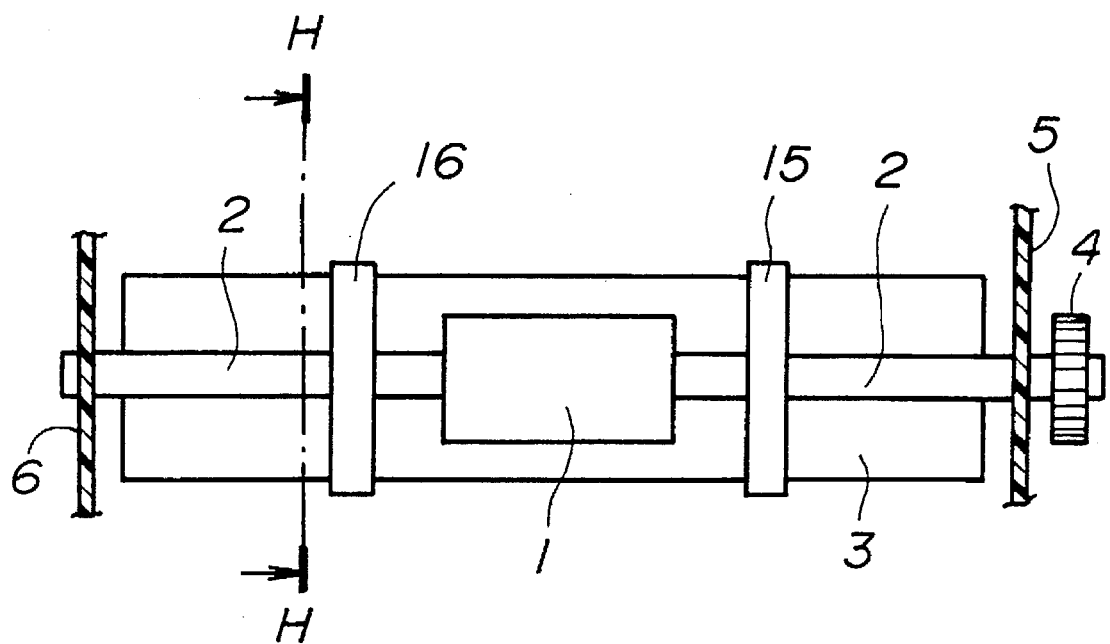
FIG. 8A is a plan view of a part of an image reading apparatus according to a sixth embodiment of the present invention.

A description will now be given of a sixth embodiment according to the present invention. FIG. 8A is a plan view of a part of an image reading apparatus according to the sixth embodiment of the present invention. In FIG. 8A, parts that are the same as the parts shown in FIG. 1A are given the same reference numerals, and descriptions thereof will be omitted.

Figure 9A:
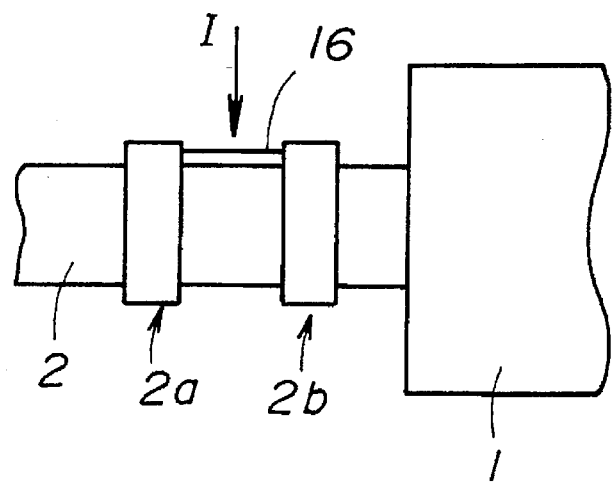
FIGS. 9A and 9B are views of a part of a shaft shown in FIG. 8A.
Figure 9B:
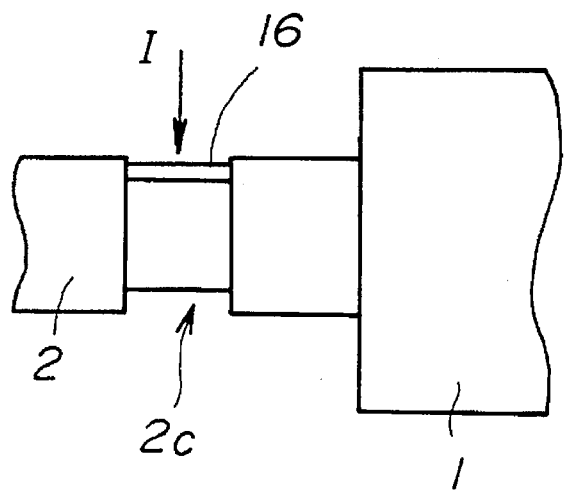

In this embodiment, leaf springs 15 and 16 are provided for pressing the shaft 2 by a pressing force I, and thus the roller 1 is pressed against the contact glass 3. The leaf springs 15 and 16 are positioned at opposite sides of the roller 1, respectively. A step is provided to a portion of the shaft 2 pressed by each of the leaf springs 15 and 16 so that the leaf springs 15 and 16 do not slide along the shaft 2. The step may be provided by forming large diameter portions 2a and 2b on the shaft 2 as shown in FIG. 9A, or as an alternative, by forming an annular groove 2c as shown in FIG. 9B.

Figure 8B:
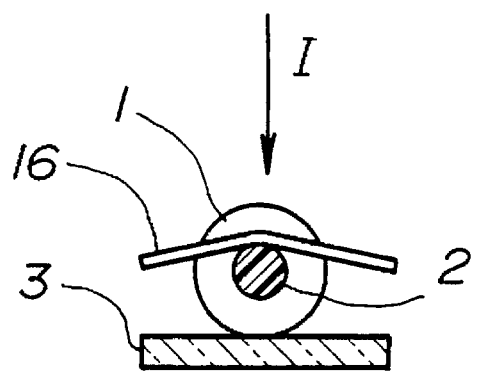
FIG. 8B is a cross-sectional view taken along a line H—H in FIG. 8A.

Since each of the leaf springs 15 and 16 are elastically bent as shown in FIG. 8B, a deformation of the shaft 2 in a direction perpendicular to the axial direction of the shaft 2 is prevented. This is the same effect as that of the first and second protruding members of the first embodiment. Additionally, since at least one end of each of the leaf springs 15 and 16 is fixed to a stationary part such as the top plate 11 (refer to FIG. 1A), the shaft 2 cannot move in the axial direction. Accordingly, there is no need to provide fixing means for fixing an axial position of the shaft 2 such as an E-ring. This reduces a number of assembling processes and a number of parts, and thus a manufacturing cost of the image reading apparatus is reduced.

A description will now be given, with reference to FIGS. 10A, 10B and 10C, of a mounting construction of the leaf springs 15. The mounting construction of the leaf spring 16 is the same as that of the leaf spring 15, and thus a description thereof will be omitted.

Figure 10A:
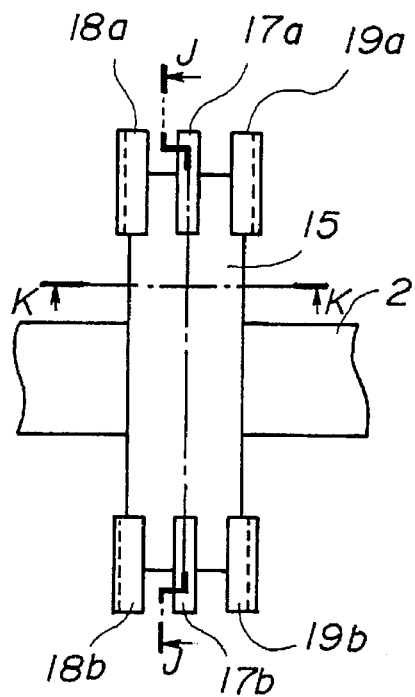
FIG. 10A is a plan view of a leaf spring shown in FIG. 8A.
Figure 10B:
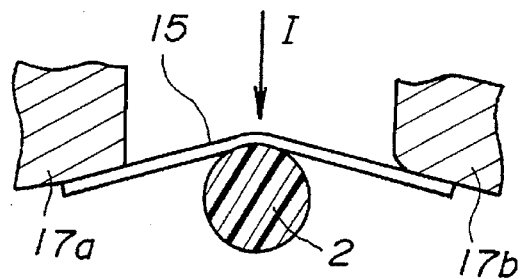
FIG. 10B is a cross-sectional view taken along a line J—J in FIG. 10A.
Figure 10C:
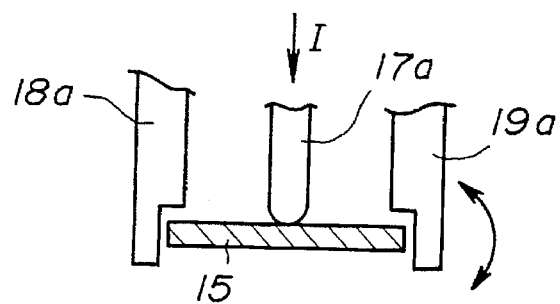
FIG. 10C is a cross-sectional view taken along a line K—K in FIG. 10A.

As shown in FIG. 10A, an end of the leaf spring 15 is supported by a spring support comprising a center support 17a and a pair of side supports 18a and 19a. The other end of the leaf spring is supported by a spring support comprising a center support 17b and a pair of side supports 18b and 19b. Each of the supports 17a, 17b, 18a, 18b, 19a and 19b is extended from a stationary part of the image reading apparatus such as the top plate 11 (refer to FIG. 1A). When opposite ends of the leaf spring 15 are set in the respective spring supports, the leaf spring 15 is elastically bent as shown in FIG. 10B so that the shaft 2 positioned under the center of the leaf spring 15 is pressed by a spring force generated by the leaf spring 15. Each end of the leaf spring 15 is mainly pressed by the center supports 17a and 17b as shown in FIG. 10C. That is, ends of the center supports 17a and 17b protrude from a support surface of each of the side supports 18a, 18b, 19a and 19b. Additionally, an end of each of the center supports 17a and 17b is rounded so that the leaf spring 15 is rotatably supported. Accordingly, the leaf spring 15 can always contact the shaft 2 over its entire width even when the shaft 2 is bent in a direction perpendicular to the feeding direction of the original sheet. This ensures a stable pressing action of the roller 1 against the original sheet, and thus a stable feed operation of the original can be achieved.

The present invention is not limited to the specifically disclosed embodiments, and variations and modifications may be made without departing from the scope of the present invention.

What is claimed is:

1. An image reading apparatus for reading an image on an original sheet while the original sheet is fed along a reading surface, said image reading apparatus comprising:

a roller which is pressed against said reading surface so that said original sheet interposed between said roller and said reading surface is fed by a rotation of said roller;

a shaft extending from opposite ends of said roller so as to support said roller and transmit a rotational force to said roller, said shaft capable of being elastically deformed;

supporting means for rotatably supporting said shaft; and restricting means for restricting a deformation of said shaft in a direction perpendicular to a rotational axis of said shaft and parallel to said reading surface.

2. The image reading apparatus as claimed in claim 1, wherein said restricting means comprises a pair of first protruding members which contact said shaft when said shaft is deformed, said first protruding members being positioned on a side of said shaft from which said original sheet is supplied, one of said first protruding members being positioned on a first side of said roller with a first distance apart from a first end of said roller, the other of said first protruding members being positioned on a second side opposite to said first side with respect to said roller with a second distance apart from a second end of said roller opposite to said first end.

3. The image reading apparatus as claimed in claim 2, wherein said first distance is equal to said second distance so that said roller is always parallel to the rotational axis of said shaft.

4. The image reading apparatus as claimed in claim 3, wherein said first distance and said second distance are a predetermined distance so that said roller is displaced by a predetermined distance in a direction opposite to a feeding direction of said original.

5. The image reading apparatus as claimed in claim 2, wherein said first distance is greater than said second distance, and a guiding member is provided on said first side of said roller, said guiding member contacting a side of said original sheet when said original sheet is fed by said roller.

6. The image reading apparatus as claimed in claim 2, wherein said one of said first protruding members is positioned a third distance apart from said shaft in the direction opposite to a feeding direction of said original sheet and said the other of said first protruding members is positioned a fourth distance apart from said shaft in the direction opposite to the feeding direction of said original sheet, said third distance being greater than said fourth distance; and a guiding member is provided on said first side of said roller, said guiding member contacting a side of said original sheet when said original sheet is fed by said roller.

7. The image reading apparatus as claimed in claim 1, wherein said restricting means comprises a pair of second protruding members which contact said shaft when said shaft is deformed, said second protruding members being positioned on a side of said shaft opposite to that from which said original sheet is supplied, one of said second protruding members being positioned on a first side of said roller and adjacent to a first end of said roller, the other of said second protruding members being positioned on a second side opposite to said first side with respect to said roller and adjacent to a second end of said roller opposite to said first end.

8. The image reading apparatus as claimed in claim 1, further comprising an elastic sheet member on each side of said roller, said elastic sheet member elastically pressing said original sheet against said reading surface when said original sheet is fed by said roller; and a guiding member provided on said first side of said roller, said guiding member contacting a side of said original sheet when said original sheet is fed by said roller, said roller being positioned on said first side with respect to a center of said shaft.

9. The image reading apparatus as claimed in claim 1, wherein said restricting means comprises a pair of leaf springs which press said shaft from an opposite side of said shaft from said reading surface, one of said leaf springs being positioned on a first side of said roller, the other of said leaf springs being positioned on a second side opposite to said first side with respect to said roller, each of said leaf springs contacts said shaft in the middle of a length thereof, opposite ends of each of said leaf springs being supported at a position closer to said reading surface than a position of said shaft whereon said leaf springs are positioned so that each of said leaf springs is bent in the middle thereof.

10. The image reading apparatus as claimed in claim 9, wherein said shaft has a pair of annular projections between which one of said leaf springs is interposed so that a movement of said shaft in an axial direction thereof is restricted.

11. The image reading apparatus as claimed in claim 9, wherein said shaft has an annular groove in which a middle portion of one of said leaf springs is situated so that a movement of said shaft in an axial direction thereof is restricted.

12. The image reading apparatus as claimed in claim 9, wherein said opposite ends of said leaf springs are rotatably supported by respective supporting members so that each of said leaf springs are rotatable about an axis perpendicular to the rotational axis of said shaft.

13. An image forming apparatus for reading an image on an original sheet while the original sheet is fed along a reading surface, said image reading apparatus comprising:

a roller which is pressed against said reading surface so that said original sheet interposed between said roller and said reading surface is fed by a rotation of said roller;

a shaft extending from opposite ends of said roller so as to support said roller and transmit a rotational force to said roller, said shaft capable of being elastically deformed;

supporting means for rotatably supporting said shaft; and a leaf spring which presses said shaft from an opposite side of said shaft from said reading surface, said leaf spring contacting said shaft in the middle of a length thereof, opposite ends of said leaf spring being supported at a position closer to said reading surface than a position of said shaft whereon said leaf spring is positioned so that said leaf spring is bent in the middle thereof.

14. An apparatus for feeding an original sheet along a reading surface, comprising:

a roller which is pressed against said reading surface so that said original sheet interposed between said roller and said reading surface is fed by a rotation of said roller;

a shaft which is rotatably supported extending from opposite ends of said roller so as to support said roller and transmit a rotational force to said roller, said shaft capable of being elastically deformed; and a pair of first protruding members which contact said shaft when said shaft is deformed and positioned on a side of said shaft from which said original sheet is supplied, one of said pair of first protruding members being positioned on a first side of said roller, and the other of said pair of first protruding members being positioned on a second side opposite to said first side with respect to said roller.

15. The apparatus as claimed in claim 14, further comprising:

a pair of second protruding members positioned on a side of said shaft opposite to that from which said original sheet is supplied, one of said pair of second protruding members being positioned on the first side of said roller and adjacent to a first end of said roller, the other of said pair of second protruding members being positioned on the second side opposite to the first side with respect to said roller and adjacent to a second end of said roller opposite to said first end.

16. The apparatus as claimed in claim 14, wherein:

the pair of first protruding members are arranged to restrict a deformation of said shaft in a direction perpendicular to a rotational axis of aid shaft and parallel to said reading surface.

* * * * *